(12) United States Patent
Nagy et al.

(10) Patent No.: US 7,527,224 B2
(45) Date of Patent: May 5, 2009

(54) RADIO BIN SPACER

(75) Inventors: Paul Wayne Nagy, Macomb, MI (US);
Ralph John Provitz, Macomb, MI (US)

(73) Assignee: International Automotive Components Group North America, Inc., Dearborn, MI (US)

( * ) Notice: Subject to any disclaimer, the term of this patent is extended or adjusted under 35 U.S.C. 154(b) by 244 days.

(21) Appl. No.: 10/711,100

(22) Filed: Aug. 23, 2004

(65) Prior Publication Data

US 2006/0038090 A1 Feb. 23, 2006

(51) Int. Cl.
*G12B 9/00* (2006.01)
(52) U.S. Cl. .................................. 248/27.1; 220/241
(58) Field of Classification Search .............. 248/27.1, 248/27.63; 220/241, 242, 50, 53, 66, 67; 439/607
See application file for complete search history.

(56) References Cited

U.S. PATENT DOCUMENTS

| | | | |
|---|---|---|---|
| 4,868,715 A | 9/1989 | Putman et al. | |
| 5,307,327 A * | 4/1994 | Green et al. | 369/12 |
| 5,452,175 A * | 9/1995 | Tsai | 361/643 |
| 5,609,414 A * | 3/1997 | Caluori | 362/366 |
| 5,873,749 A | 2/1999 | Takiguchi et al. | 439/534 |
| 6,330,121 B1 * | 12/2001 | Kobayashi et al. | 359/831 |
| 6,517,145 B2 | 2/2003 | Hedderly | 296/192 |
| 6,533,225 B1 * | 3/2003 | Berges et al. | 248/27.1 |
| 6,651,936 B2 * | 11/2003 | Upson et al. | 248/27.3 |
| 6,709,041 B1 | 3/2004 | Hotary et al. | 296/70 |
| 2005/0032426 A1* | 2/2005 | Tanaka | 439/607 |
| 2005/0231954 A1* | 10/2005 | Czech | 362/263 |

OTHER PUBLICATIONS

Combined Search and Examination Report of Nov. 30, 2005 for GB0517108.7.
Search Report of Mar. 19, 2007 for DE 10 2005 039 326.8-21, Lear Corporation.

* cited by examiner

*Primary Examiner*—Amy J. Sterling
(74) *Attorney, Agent, or Firm*—Brooks Kushman P.C.

(57) ABSTRACT

Disclosed is a radio bin spacer that allows for a standard sized radio to be mounting in an instrument panel mounting area sized for the larger style radio.

17 Claims, 1 Drawing Sheet

RADIO BIN SPACER

BACKGROUND OF THE INVENTION

1. Field of the Invention

The present invention generally relates to a vehicle interior and, more particularly, to spacer bin that provides for mounting a standard radio within a instrument panel cavity designed for the larger sized radio having a navigation screen.

2. Description of the Related Art

With ever-increasing pressure from automotive consumers, flexibility and adaptability of vehicle interiors is increasingly required in order to provide a vehicle that meets broad customer demands. Further, with the greater number of components available for installation within the instrument panel there is increasing pressure from manufacturers to provide the needed flexibility while simplifying the assembly line procedures and reducing parts inventory and costs.

For example, U.S. Pat. No. 5,873,749 issued Feb. 23, 1999 to Takiguchi et al. teaches an electrical component mounting opening in an instrument panel unit having an electrical connection means as well as physical attachment means incorporated within said electrical component mounting opening.

U.S. Pat. No. 6,517,145 issued Feb. 11, 2003 to Hedderly teaches a cast magnesium instrument panel structure which may be cast as a single unit or as multiple mating units.

U.S. Pat. No. 6,709,041 issued Mar. 23, 2004 to Hotary et al. teaches a center consol adaptable to receive various components within pre-sized component mounting openings.

DISCLOSURE OF THE INVENTION

The present invention provides advantages and alternatives over the prior art by providing a radio spacer bin that allows for a single bracket in the instrument panel to accept the mounting of either a larger style radio unit or a smaller standard radio unit.

According to a further aspect of the present invention, there is provided a radio bin spacer allowing for the mounting of a standard sized radio in a mounting area designed for the larger style radio comprising: a bin having one closed end and one open end and further having a top wall, a bottom wall and two side walls; said top wall having a structural rib located thereon; said side walls each having a mounting tab located thereon wherein each said mounting tab has a bore located therein; and the rear end of said bin having a pair of spacer stanchions located thereon; thereby providing a mounting area sized for a standard radio in a larger radio sized opening in an instrument panel.

According to yet another aspect of the present invention a radio bin spacer allowing for the mounting of a standard sized radio in a mounting area designed for the larger larger style radio comprising: a bin having one closed end and one open end and further having a top wall, a bottom wall and two side walls; said top wall having a structural rib located thereon; said side walls each having a mounting tab located thereon wherein each said mounting tab has a bore located therein; structural ribs located on said side walls adjacent to said mounting tabs; and the rear end of said bin having a pair of spacer stanchions located thereon; thereby providing a mounting area sized for a standard radio in a larger radio sized opening in an instrument panel.

The present invention thus advantageously provides a for flexibility of radio options to the consumer while reducing the number of brackets and their cost to the manufacturer as well as simplifying the line assembly procedures.

DESCRIPTION OF THE PREFERRED EMBODIMENTS OF THE INVENTION

Figure 1:
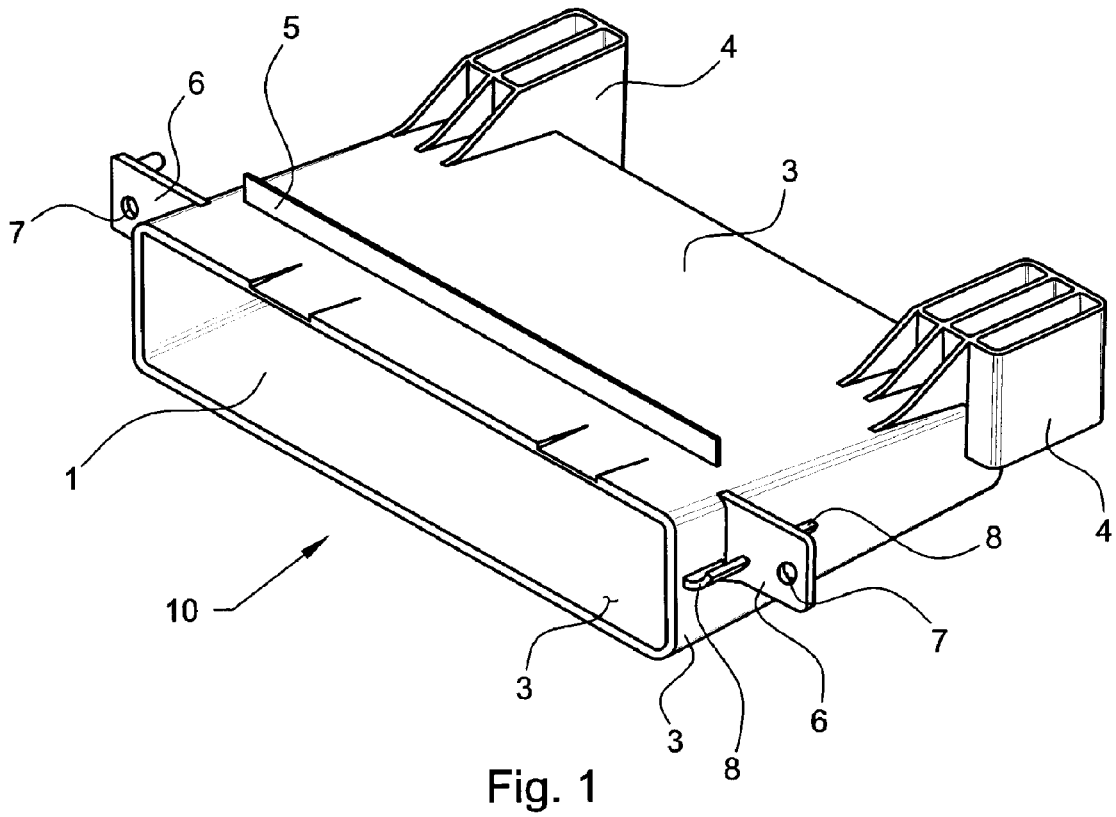
FIG. 1 shows a perspective front view of the radio bin spacer of the present invention.

Reference will now be made to the drawings, wherein to the extent possible like reference numerals are utilized to designate like components throughout the various views. Referring to FIG. 1, which presents a radio bin spacer 10 of the present invention comprising a bin having and open front end 1, a closed rear end 2 (FIG. 2) and four walls 3.

As further shown in FIG. 1, radio bin spacer 10 has located on each rear corner a spacer stanchion 4, a structural rib 5 located on the top sidewall 3, and a pair of mounting tabs 6, each said tab 6 having a bore 7 for fixedly mounting said radio bin spacer 10 to an instrument panel mounting bracket 20.

As also shown in FIG. 1, are optional bin front structural ribs 8 located sidewalls 3 on each side of tabs 6.

Figure 2:
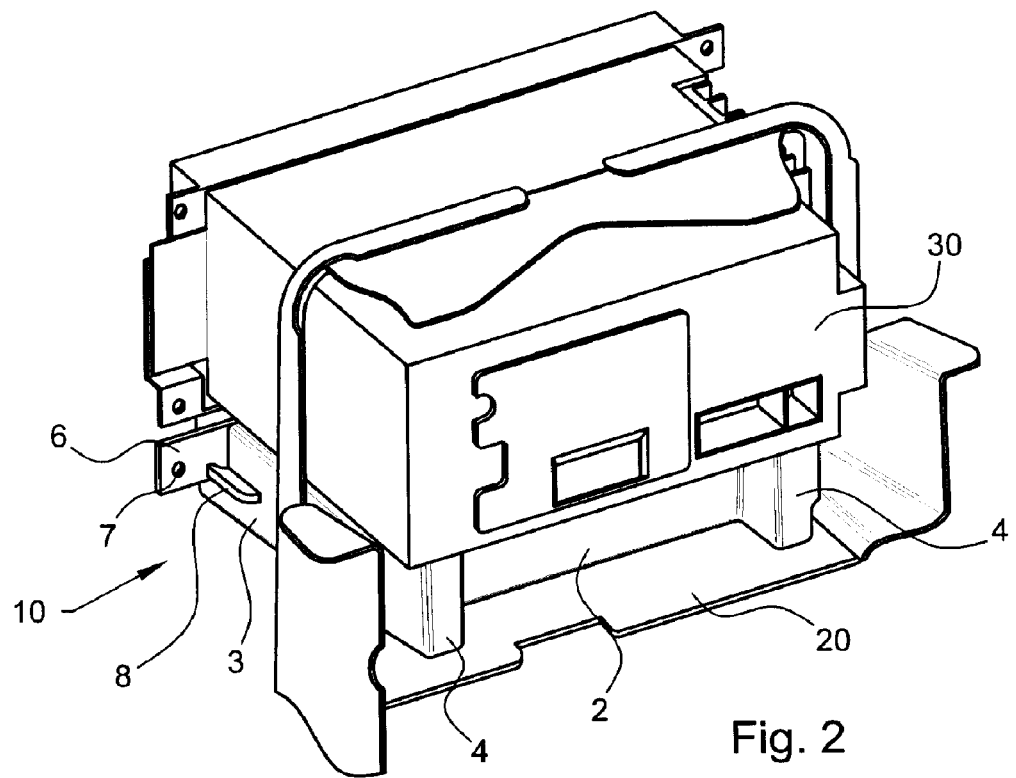
FIG. 2 shows a perspective partial section rear view of a instrument panel mounting bracket holding a component and the radio bin spacer of the present invention.

Referring now to FIG. 2, there is shown rear perspective view of an instrument panel mounting bracket 20 holding a component 30 as well as the radio bin spacer 10 of the present invention. The radio bin spacer 10 is shown with rear end 2 and spacer stanchions 4 as well as mounting tab 6 having bore 7 and optional bin front structural ribs 8 located on walls 3

As previously set forth, the present invention allows for a single instrument panel mounting bracket 20 to be used to mount either a larger style radio or the smaller sized standard style radio within the instrument panel without the need for separate instrument mounting brackets being installed depending on the radio option ordered.

The presently preferred radio bin spacer 10 comprises an injection molded plastic construction. The preferred plastics for injection molding the radio bin spacer 10 of the present invention include, for example, polypropylene, thermoplastic olefins (TPO), acrylonitrile butadiene styrene (ABS), and polycarbonates. Presently preferred is polypropylene. It is to be understood that the present invention may be manufactured using other methods and materials which are well known in the art, such as for example, magnesium casting, and the like.

It is also contemplated that the present invention may be utilized in an instrument panel that incorporates larger style radio mounting features that do not require a separate mounting bracket.

Although the preferred embodiments of the present invention has been disclosed, various changes and modifications may be made without departing from the scope of the invention as set forth in the appended claims.

What is claimed is:

1. A radio bin spacer allowing for the mounting of a standard sized radio in a mounting area designed for a larger radio comprising:

a generally rectangular radio bin spacer having one closed rear end and one open end and further having a planar top wall, a planar bottom wall and two planar side walls;

said top wall having a structural rib located thereon; said side walls each having a mounting tab located thereon wherein each said mounting tab has a bore located therein;

said closed rear end of said bin having a pair of spacer stanchions located thereon; and said bin having exterior dimensions allowing mounting within an instrument panel opening designed for a larger than standard sized radio and further having interior dimensions allowing mounting of a standard sized radio directly therein;

thereby providing a mounting area sized for a standard radio in an opening in an instrument panel sized for a larger radio.

2. The radio bin spacer as claimed in claim 1 wherein, said radio bin spacer is an injection molded plastic.

3. The radio bin spacer as claimed in claim 2 wherein, said radio spacer bin is injection molded of polypropylene.

4. The radio bin spacer as claimed in claim 2 wherein, said radio spacer bin is injection molded of thermoplastic olefins (TPO).

5. The radio bin spacer as claimed in claim 2 wherein, said radio spacer bin is injection molded of acrylonitrile butadiene styrene (ABS).

6. The radio bin spacer as claimed in claim 2 wherein, said radio spacer bin is injection molded from polypropylene.

7. The radio bin spacer as claimed in claim 2 wherein, said radio spacer bin is injection molded of polycarbonate.

8. The radio bin spacer as claimed in claim 1 wherein, said radio spacer bin is a cast metal.

9. The radio bin spacer as claimed in claim 8 wherein, said radio spacer bin is cast from one of the group consisting of magnesium, aluminum, alloys of magnesium, and alloys of aluminum.

10. A radio bin spacer allowing for the mounting of a standard sized radio in a mounting area designed for a larger radio comprising:

a generally rectangular radio bin spacer having one closed rear end and one open end and further having a planar top wall, a planar bottom wall and two planar side walls; said top wall having a structural rib located thereon; said side walls each having a mounting tab located thereon wherein each said mounting tab has a bore located therein;

structural ribs located on said side walls adjacent to said mounting tabs; said closed rear end of said bin having a pair of spacer stanchions located thereon; and said bin having exterior dimensions allowing mounting within an instrument panel opening designed for a larger than standard sized radio and further having interior dimensions allowing mounting of a standard sized radio directly therein;

thereby providing a mounting area sized for a standard radio in an opening in an instrument panel sized for a larger radio.

11. The radio bin spacer as claimed in claim 10 wherein, said radio bin spacer is an injection molded plastic.

12. The radio bin spacer as claimed in claim 11 wherein, said radio spacer bin is injection molded of polypropylene.

13. The radio bin spacer as claimed in claim 11 wherein, said radio spacer bin is injection molded of thermoplastic olefins (TPO).

14. The radio bin spacer as claimed in claim 11 wherein, said radio spacer bin is injection molded of acrylonitrile butadiene styrene (ABS).

15. The radio bin spacer as claimed in claim 11 wherein, said radio spacer bin is injection molded of polycarbonate.

16. The radio bin spacer as claimed in claim 10 wherein, said radio spacer bin is a cast metal.

17. The radio bin spacer as claimed in claim 16 wherein, said radio spacer bin is cast from one of the group consisting of magnesium, aluminum, alloys of magnesium, and alloys of aluminum.

* * * * *